United States Patent [19]

Ermacora et al.

[11] Patent Number: 4,714,123

[45] Date of Patent: Dec. 22, 1987

[54] FARM MACHINE WITH IMPROVED TRANSMISSION DEVICE

[75] Inventors: Rino Ermacora; Thierry Krebs, both of Saverne, France

[73] Assignee: Kuhn, S.A., Saverne, France

[21] Appl. No.: 844,562

[22] Filed: Mar. 27, 1986

[30] Foreign Application Priority Data

Mar. 28, 1985 [FR] France .................. 85 04897

[51] Int. Cl.4 ............... B60K 25/06; A01B 71/06
[52] U.S. Cl. ........................ 180/14.4; 180/53.1; 172/47; 172/125
[58] Field of Search ............ 172/47, 125, 117, 74, 172/98, 99; 180/14.4, 53 R, 53.1

[56] References Cited

U.S. PATENT DOCUMENTS

| | | | |
|---|---|---|---|
| 2,320,775 | 6/1943 | Garner | 172/47 |
| 2,421,044 | 5/1947 | Vutz | 180/14.4 |
| 2,724,448 | 11/1955 | Rossler | 180/14.4 |
| 4,366,877 | 1/1983 | Vissers | 172/47 |

FOREIGN PATENT DOCUMENTS

| | | | |
|---|---|---|---|
| 27295 | 4/1981 | European Pat. Off. | |
| 124462 | 11/1984 | European Pat. Off. | |
| 1052143 | 3/1959 | Fed. Rep. of Germany. | |
| 248386 | 2/1948 | Switzerland. | |
| 1257925 | 12/1971 | United Kingdom | 180/14.4 |

*Primary Examiner*—Richard J. Johnson
*Attorney, Agent, or Firm*—Oblon, Fisher, Spivak, McClelland, & Maier

[57] ABSTRACT

The farm machine 2 according to the invention comprises a tongue 3 provided with a transmission device 5 fastened to the tongue 3 by a fastening housing 27 comprising a connecting pin 36 and connecting elements 37, 38 which limit the rotation of the transmission housing 5 around the connecting pin 36.

9 Claims, 4 Drawing Figures

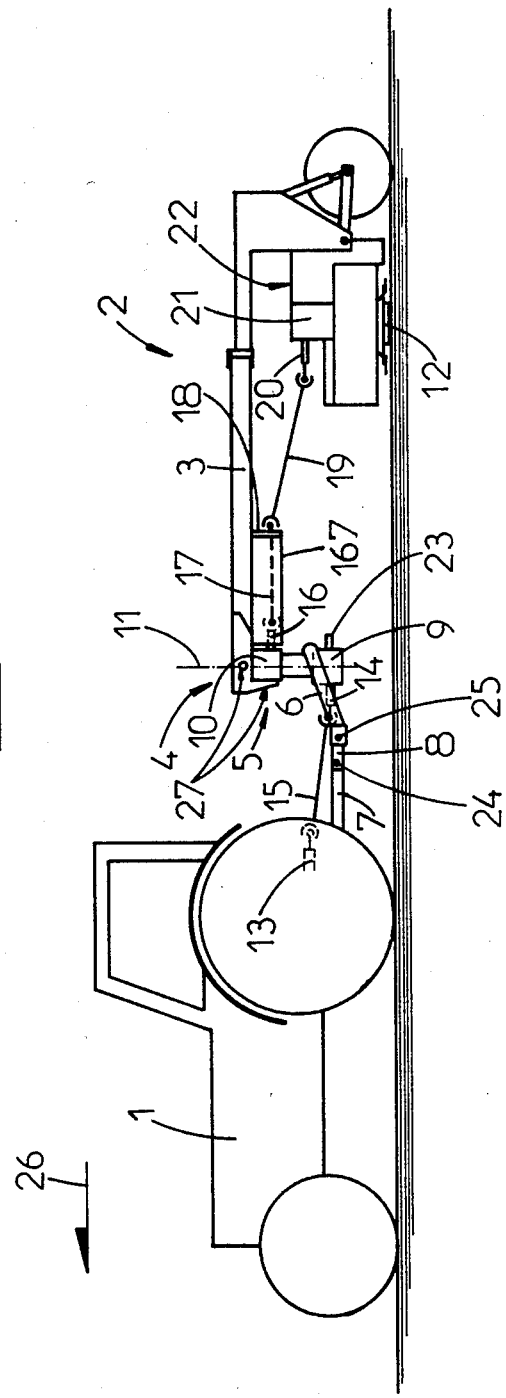

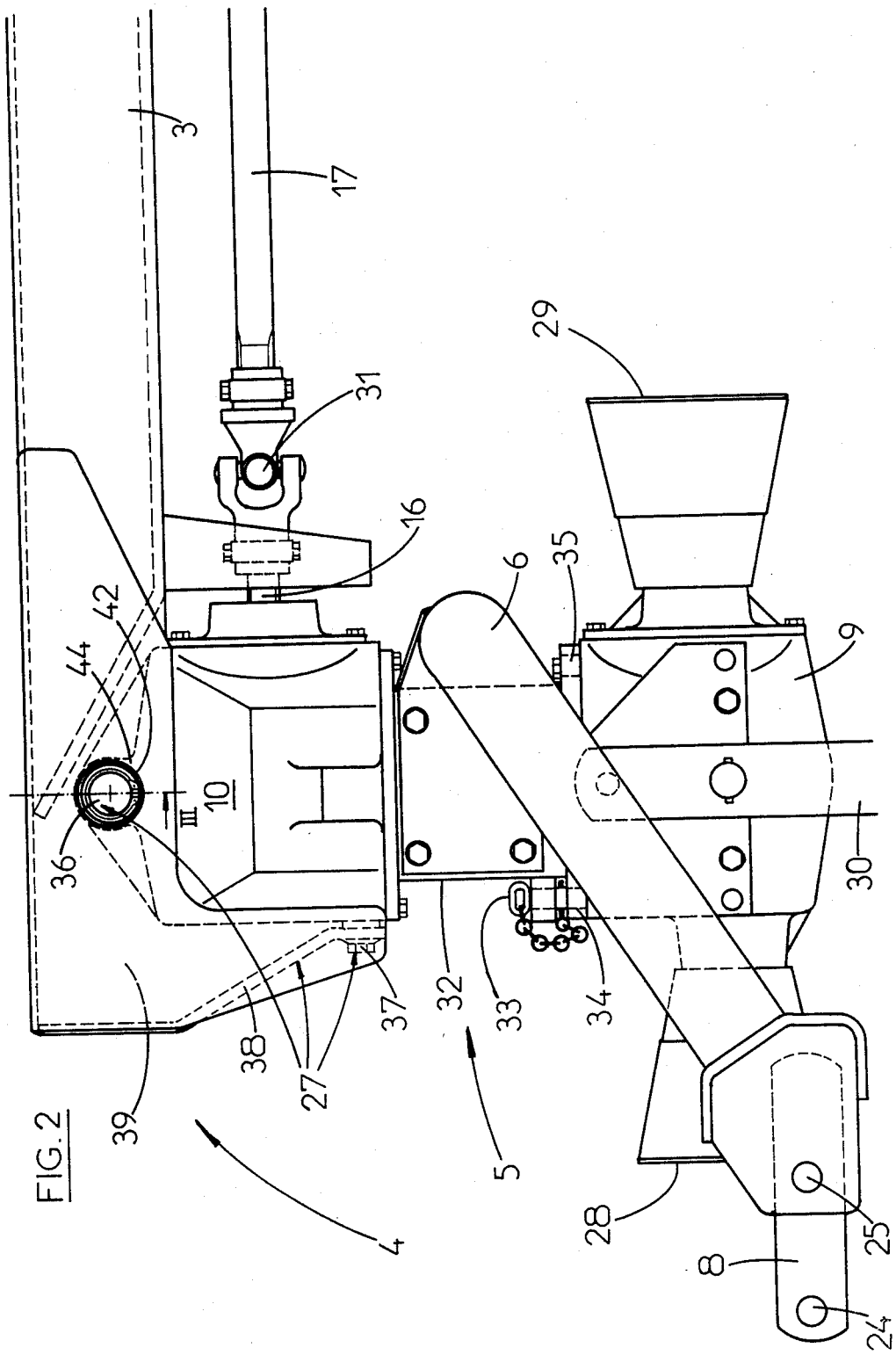

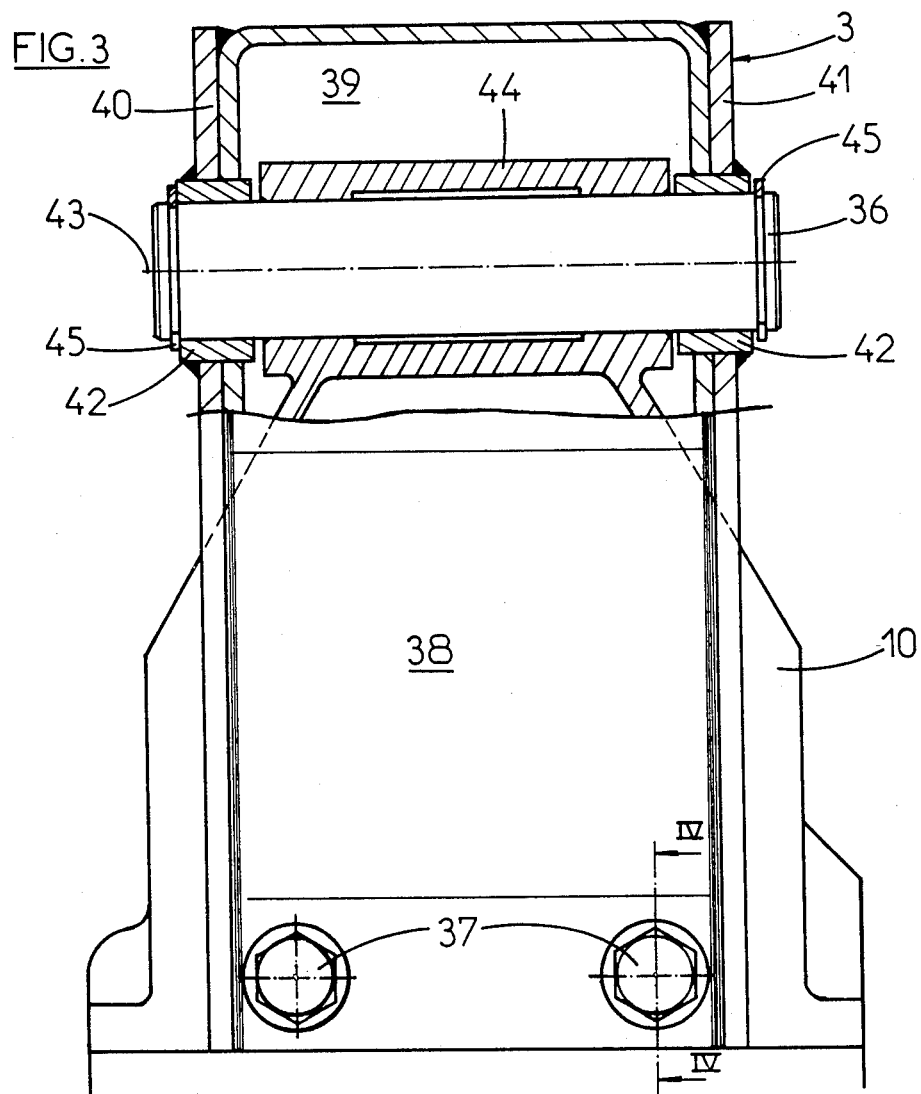

FARM MACHINE WITH IMPROVED TRANSMISSION DEVICE

FIELD OF THE INVENTION

This invention relates to a farm machine provided with a tongue comprising a transmission housing.

BACKGROUND OF THE INVENTION

On such a farm machine that is now known, the tongue comprises at its front part a sort of prismatic cavity determined by three walls, two side walls and a front wall. The upper part of the transmission housing extends inside the prismatic cavity between the three walls and is fastened there by a number of bolts.

In practice, it has been found that this mode of fastening the transmission housing can be liable to loosening of the assembly bolts, in particular the assembly bolts that fasten the transmission housing to the side walls of the prismatic cavity.

This loosening phenomenon is due both to the production tolerances of the upper part of the transmission housing and, especially, to the production tolerances of the prismatic cavity, particularly the tolerances on the inside distance separating the two side walls.

Since the tongue is a mechanically welded part, the production tolerances must be relatively broad. Thus, during tightening of the side assembly bolts, the side walls are first deformed a certain amount before they come in contact with the upper part of the transmission housing. It is then found that an elastic assembly instead of a solid assembly is obtained, due to the elastic deformation of the side walls.

In addition, the assembly bolts which fasten the transmission housing to the side walls are subject to shear stress.

It is then understood, considering the facts:

(1) that the entire tractive force needed to draw the machine goes through the assembly bolts;

(2) that the resulting assembly is generally an elastic assembly; and (3) that the side bolts are subjected to shear stress, that the vibrations produced by the configuration of the ground on which the machine travels during work causes loosening of the side bolts—which, of course, is not desirable.

Moreover, the known assembly mode does not allow a fast and easy mounting. This is because, during the entire operation of introducing and tightening the bolts, it is necessary to hold the transmission housing by positioning it exactly so that the bolts can be introduced into the corresponding threaded holes. Therefore, it will be understood, considering the relatively heavy weight of the transmission housing, that its mounting is long and expensive.

OBJECT OF THE INVENTION

The object of this invention is to remedy or ameliorate the drawbacks of the machine of the prior art.

SUMMARY OF THE INVENTION

For this purpose, the farm machine according to this invention is characterized in that the transmission housing is fastened to the tongue by a fastening device comprising a connecting pin and connecting elements which limit the rotation of the transmission housing around the connecting pin. With this mode of fastening the transmission housing, there is no longer a danger of the fastening device coming loose, since the tractive forces can be adsorbed by the connecting pin and the connecting elements. If the connecting elements comprise bolts, the bolts can be designed to be subjected to tensile stress, which is ideal for a bolt.

In addition, mounting is very fast and easy because mounting can be accomplished merely by maintaining and positioning the transmission housing during introduction of the connecting pin. After introduction of the connecting pin, the transmission housing is already connected to the tongue. It then suffices to fasten the tansmission housing to the tongue with the connecting elements, if the connecting elements comprise assembly elements.

According to an additional characteristic of the invention, the connecting pin extends crosswise and preferably perpendicular to the longitudinal axis of the tongue. The making of the bearings of the tongue through which the connecting pin goes is thus substantially facilitated. In particular, the making of the bearings of the tongue through which the connecting pin goes as well as the connecting pin itself is easier, when the connecting pin is cylindrical. This shape is mechanically easier to make and therefore more economical. Furthermore, it facilitates mounting of the connecting pin.

According to an additional characteristic of the invention, the connecting elements are partly constituted by the tongue which in at least one direction limits the relative rotation of the transmission housing around the connecting pin.

BRIEF DESCRIPTION OF THE DRAWINGS

Other characteristics and advantages of the invention will be apparent from the following description of a nonlimiting example of the presently preferred embodiment of the invention.

FIG. 1 is a side view of a farm machine according to the invention hitched to a tractor.

FIG. 2 is a side view of the front part of the tongue of the farm machine of FIG. 1.

FIG. 3 is a front view of the front part of the tongue with a view in partial section along line III—III in FIG. 2 of the fastening device at the connecting pin.

FIG. 4 is a view in section along line IV—IV in FIG. 3 of the connecting device at the connecting elements.

DETAILED DESCRIPTION OF THE PRESENTLY PREFERRED EMBODIMENT

FIG. 1 shows a farm unit made up of a tractor 1 and a farm machine 2. The farm machine 2 has a body 22 provided with a tongue 3 which makes its connections to the tractor 1 possible. The tractor 1 draws the farm machine 2 in the direction indicated by an arrow 26 in FIG. 1.

A transmission housing 5 is fastened to the front part 4 of the tongue 3. The transmission housing 5 is attached to a hitching member 6 which advantageously has a U-shape in plan view so that each branch of the U can be connected to a lower arm 7 of the hitch of the tractor 1. The connection between each branch of the hitching member 6 and the corresponding lower arm 7 is achieved by oscillating lugs 8.

The transmission housing 5 is formed by a primary part 9 and a secondary part 10 which can rotate in relation to one another around an upwardy directed axis 11. The axis 11 is preferably at least approximately vertical. The primary part 9 of the transmission housing 5 is connected to the hitching member 6, and the secondary part 10 of the transmission housing 5 is connected to the tongue 3. Working elements 12 of the farm machine 2 are driven in rotation from a power take-off shaft 13 of the tractor 1 which rotates at a certain speed. The power take-off 13 is connected to an input shaft 14 supported by the primary part 9 of the transmission housing 5 by a universal-joint drive shaft 15.

Movement is transmitted inside the transmission housing 5 from the input shaft 14 to an output shaft 16 by a mechanism known in the art. The output shaft 16 is connected to a shaft 17 which is supported at its end opposite to the end that is connected to the output shaft 16 by a support 18 mounted on the tongue 3. To avoid accidents, the output shaft 16 and the shaft 17 are surrounded by a protective hood 167. The shaft 17 is coupled to a second universal-joint drive shaft 19 which is connected to an input shaft 20 of a drive case 21 in the body 22 of the farm machine 2. The primary part 9 of the transmission housing 5, moreover, comprises a second input shaft 23 which makes it possible in a way known in the art to drive the working elements 12 from a power take-off shaft which rotates at a speed other than that at which the power take-off shaft 13 rotates.

As stated above, the primary part 9 of the transmission housing 5 is connected to the hitching member 6, while the secondary part 10 of the transmission housing 5 is connected to the tongue 3. Thus, as the primary part 9 and the secondary part 10 can rotate in relation to one another around the axis 11, the hitching member 6 and the tongue 3 can also rotate in relation to one another around the axis 11.

Moreover, as also stated above, the hitching member 6 is connected to the lower arm 7 of the tractor hitch by the oscillating lugs 8. The oscillating lugs 8 are respectively connected to the lower arm 7 and to the hitching member 6 by pins 24 and 25. With this design, the farm machine 2 has three degrees of freedom in relation to the tractor 1, namely:

(1) rotation around the pin 24 and/or around the pin 25 so that the farm machine 2 can move in a plane approximately vertical to the tractor 1;

(2) rotation around an axis approximately parallel to the arrow 26 thanks to the pins 24 and 25 of the oscillating lugs 8; and (3) rotation around the axis 11 so that the farm machine 2 can move in a plane approximately horizontal to the tractor 1.

The first two rotations have only a limited amplitude, but their amplitude is sufficient to allow the farm machine to adapt perfectly to the unevenness of the ground independently of the tractor 1. This arrangement also gives greater safety to the unit of the tractor 1 and the farm machine 2. If the weight of the farm machine 2 is relatively great and if the ground is very uneven, there is less danger that the farm machine 2 will cause the tractor 1 to turn over.

The third rotation, which allows negotiation of turns, can have a very great amplitude—on the order of 90°, or even more. But, considering the particular arrangement of the transmission housing 5, the drive shaft 15 which connects the power take-off shaft 13 to the input shaft 14 or to the input shaft 23 of the primary part 9 is not subjected to any stress.

In FIG. 1, it is seen that the transmission housing 5 is connected to the tongue 3 by a connecting device 27 which will be described in detail below.

FIG. 2 shows, on an enlarged scale, the front part 4 of the tongue 3 where the transmission housing 5 is fastened. The protective hood 167 has been removed for greater clarity in this figure.

As stated above, the transmission housing 5 is made up of a primary part 9 and a secondary part 10. FIG. 2 shows the primary part 9 which supports the two input shafts 14 and 23, each extending under a corresponding protective bowl 28, 29. The primary part 9 further supports a stand 30 which makes it possible to support the front part 4 of the tongue 3 when the farm machine 2 is unhitched from the tractor 1.

FIG. 2 also shows the secondary part 10. The secondary part 10 supports the output shaft 16, which is connected by a universal joint 31 to the shaft 17.

Between the primary part 9 and the secondary part 10 extends a bearing 32 of the hitching member 6 the rotation of which is blocked in relation to the primary part 9 by a pin 33 which can be introduced into a hole 34 or a hole 35 in the primary part 9, depending on whether the input shaft 14 or the input shaft 23 is to receive the movement of the universal-joint drive shaft 15.

As can be seen in FIGS. 2, 3 and 4, the transmission housing 5 is connected to the tongue 3 by the secondary part 10 by means of the connecting device 27 which comprises a connecting pin 36 and connecting elements 37,38 (bolts 37 and abutment 38) limiting the rotation of the transmission housing 5 around the connecting pin 36. For this purpose, the tongue 3 is provided on its front part with a cavity 39. The cavity 39 is open downwardly and is defined by two side walls 40, 41. In each side wall is provided a bearing 42 which is made by a ring welded in a hole provided in the corresponding side wall 40, 41. The two bearings 42 have a common axis 43 that extends approximately perpendicular to the longitudinal axis of the tongue 3.

The secondary part 10 comprises, in its upper part, a cylindrical housing 44 which extends between the side walls 40, 41 and, more precisely, between the bearings 42 of the tongue 3 so that the connecting pin 36 can extend through the cylindrical housing 44 and through the bearings 42. The connecting pin 36 is fixed axially by two circlips 45.

To block forward rotation of the transmission housing 5 around the connecting pin 36 when the tractor 1 pulls the farm machine 2, the tongue 3 comprises at the front an abutment 38, which is made in the shape of a plate closing the cavity 39 at the front. Further, the transmission housing 5 is connected to the tongue 3 by bolts 37 which block the backward rotation of the transmission housing 5 around the connecting pin 36 when the tractor 1 backs up with the farm machine 2. But the bolts 37 also are intended to connect the transmission housing 5 completely to the tongue 3, which avoids any hammering of the seconday part 10 or the connecting element 38.

With this connecting device, mounting of the transmission housing 5 on the tongue 3 is performed as follows:

(1) the upper part of the secondary part 10 of the transmission housing 5 is made to penetrate the cavity 39;

(2) the connecting pin 36 is inserted through the bearings 42 of the tongue 3 and through a cylindrical housing 44 of the secondary part 10 of the transmission housing 5;

(3) the connecting pin 36 is axially fastened by the circlips 45; and (4) finally, the secondary part 10 of the transmission housing 5 is connected to the abutment 38 by the connecting bolts 37.

As may be seen in FIGS. 2 to 4, this mode of mounting the transmission housing 5 on the tongue 3 is very simple to fabricate, can be quickly mounted, and is very reliable.

While in the example given, the mode is described of mounting a transmission housing 5 on the front part 4 of the tongue 3 of the farm machine 2, it will also be possible to adopt a similar mounting of a transmission housing on the rear part of the tongue 3. In that case, the tongue 3 is connected to the body 22 of the farm machine 2 by a joint which allows the farm machine 2 to work either to the right or to the left of the tractor 1.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A farm machine to be pulled by a tractor, said farm machine comprising:
    (a) working elements;
    (b) a body arranged to support said working elements;
    (c) a beam unit arranged for connecting said body to a tractor during use, said beam unit comprising:
        (i) a tongue having a front part, a rear part, and a longitudinal axis, said tongue being fastened at its rear part to said body;
        (ii) a transmission housing comprising an upper part and a lower part rotatable relative to said upper part about an at least approximately vertical axis; and
        (iii) a hitching member fastened to said lower part of said transmission housing and adapted to be connected to the tractor during use;
    (d) transmission output drive means arranged to transmit rotary movement from said transmission housing to said working elements, said rotary movement being received by said working elements; and
    (e) fastening means for fastening said upper part of said transmission housing to said tongue, said fastening means comprising:
        (i) a connecting pin which extends transversely entirely through said upper part of said transmission housing, said connecting pin being axially secured by first securing means, and
        (ii) second securing means for blocking rotation of said transmission housing around said connecting pin.

2. A farm machine according to claim 1 wherein said connecting pin extends entirely through said tongue.

3. A farm machine according to claim 1 wherein said connecting pin extends crosswise to the longitudinal axis of said tongue.

4. A farm machine according to claim 3 wherein said connecting pin extends perpendicularly to the longitudinal axis of said tongue.

5. A farm machine according to claim 1 wherein said connecting pin is cylindrical.

6. A farm machine according to claim 1 wherein said second securing means comprise a part of said tongue which limits, at least in one direction, the relative rotation of said transmission housing in relation to said tongue.

7. A farm machine according to claim 6 wherein said tongue comprises an abutment against which said transmission housing rests when the farm machine is drawn by the tractor to which the farm machine is hitched during use.

8. A farm machine according to claim 7 wherein said transmission housing is connected to said abutment by bolts.

9. A farm machine according to claim 6 wherein said transmission housing is connected to said tongue by bolts.

* * * * *